Figure 1:
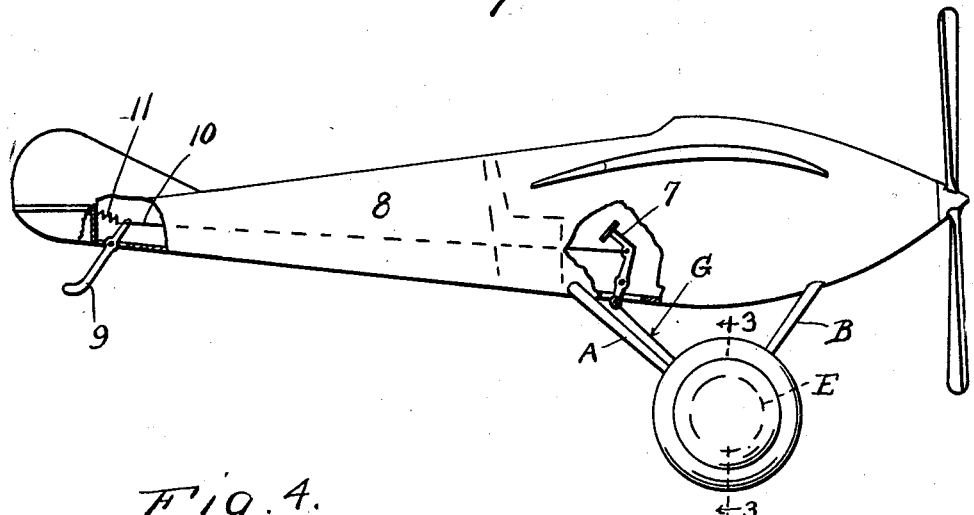

May 26, 1931.  W. BUERER  1,807,194
SAFETY BRAKING MECHANISM FOR AEROPLANES
Filed Aug. 8, 1929   3 Sheets-Sheet 1

Inventor
Wayne Buerer
By Clarence A O'Brien
Attorney

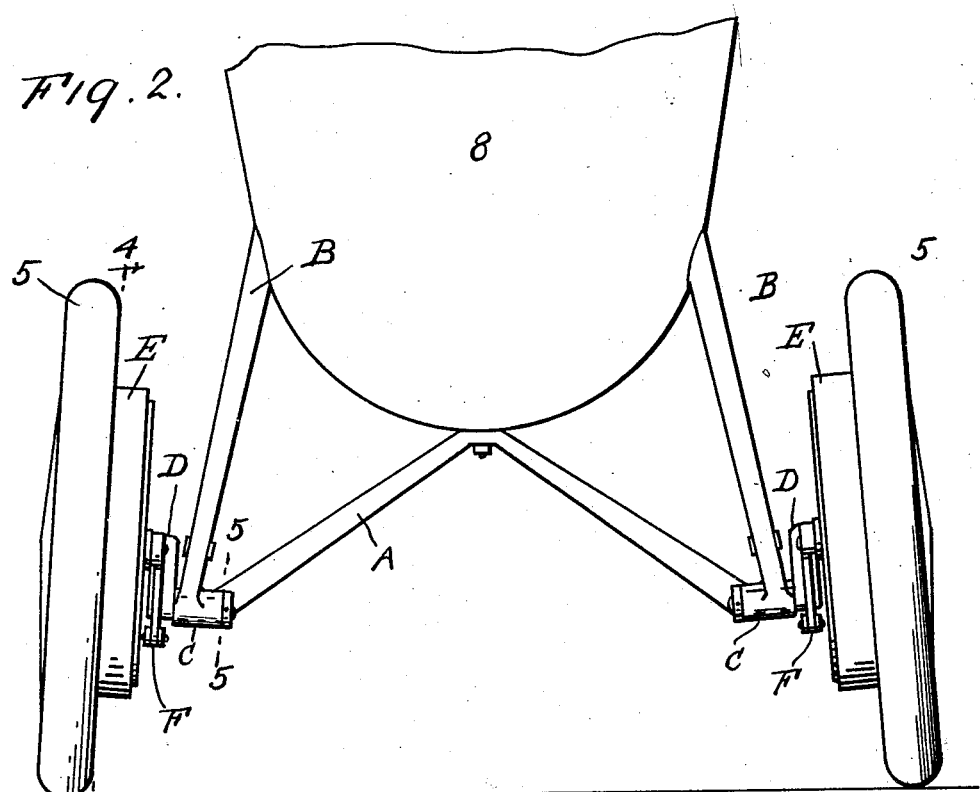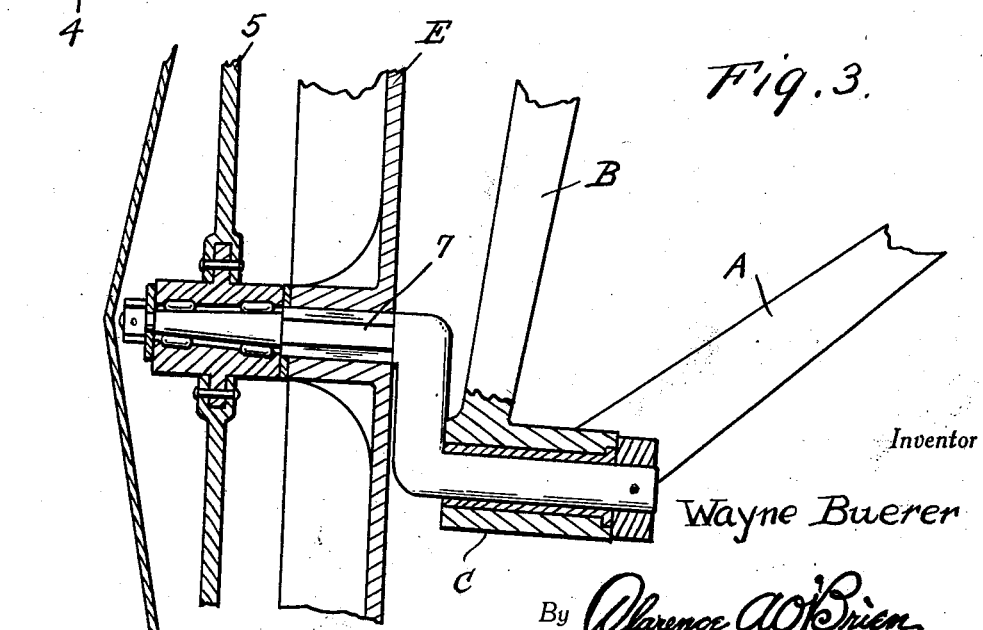

May 26, 1931. W. BUERER 1,807,194
SAFETY BRAKING MECHANISM FOR AEROPLANES
Filed Aug. 8, 1929 3 Sheets-Sheet 3

Inventor
Wayne Buerer
By Clarence A. O'Brien
Attorney

Patented May 26, 1931

1,807,194

UNITED STATES PATENT OFFICE

WAYNE BUERER, OF RENO, NEVADA

SAFETY BRAKING MECHANISM FOR AEROPLANES

Application filed August 8, 1929. Serial No. 384,296.

The present invention relates to a safety braking mechanism for aeroplanes and has for its prime object to provide a structure for preventing damage to aeroplanes due to them nosing over when brakes are applied.

Another very important object of the invention resides in the provision of a mechanism of this nature which permits the greatest possible braking effect without danger and allows for the shortest possible run after landing.

Another very important object of the invention resides in the provision of a mechanism of this nature which is suitable for any type of landing gear and does not add much weight to the aeroplane.

A still further very important object of the invention resides in the provision of a mechanism of this nature which is simple in its construction, inexpensive to manufacture and install, strong and durable, easy to manipulate, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 4:
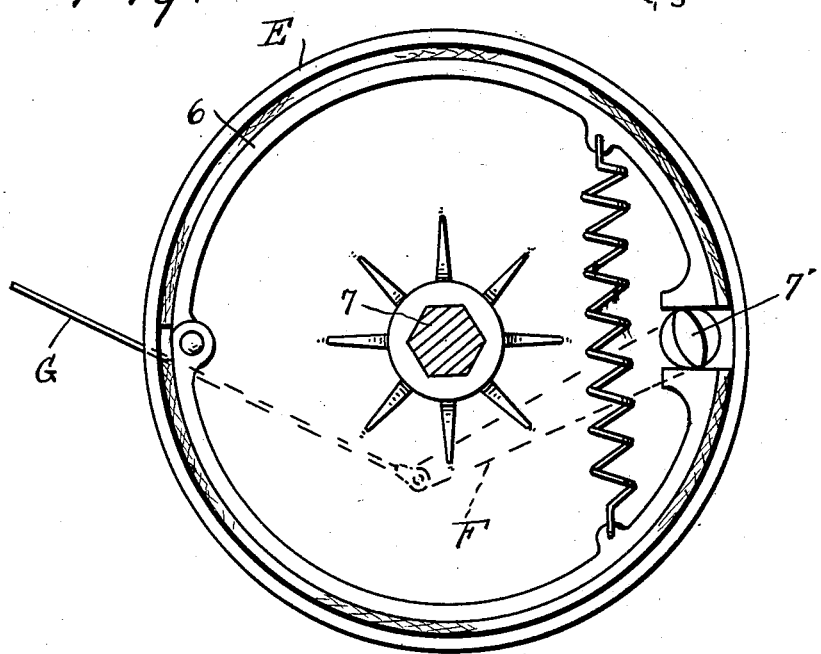
Figure 5:
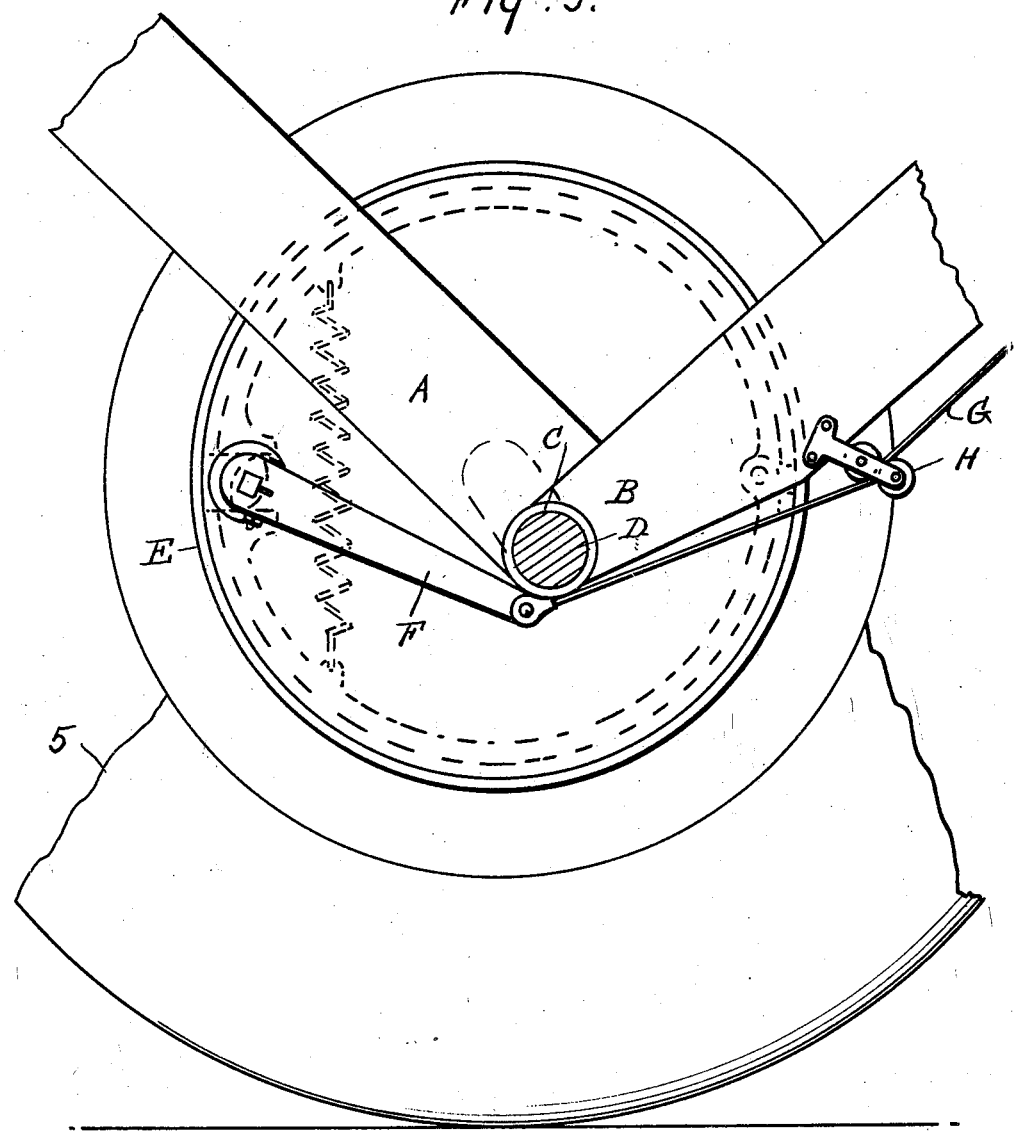
Figure 6:
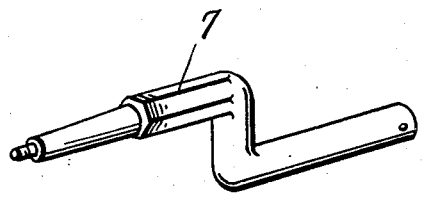

In the drawings:

Figure 1 is a side elevation of an aeroplane showing my improved mechanism incorporated therein, Figure 2 is a fragmentary front elevation thereof, Figure 3 is an enlarged detail section taken substantially on the line 3—3 of Figure 1, Figure 4 is a sectional view taken substantially on the line 4—4 of Figure 2, Figure 5 is a sectional view taken substantially on the line 5—5 of Figure 2, and Figure 6 is a perspective view of one of the axles.

Referring to the drawings in detail it will be seen that letters A and B denote the landing gear struts which have the hub C attached thereto. In this hub C is an axle D which also passes through the brake housing E and through the wheel 5.

The letter F denotes the brake arm which expands the internal shoe 6 through the medium of its cam 7 in the usual well known manner. The brake housing forms the bearing for the brake arm F and is also rigidly attached to the axle D as is indicated at 7 in Figure 3.

The axle D is free to rotate in the wheel and also in the strut hub C between certain limits but has an offset in it so that the wheel hub is not in line with the strut hub C. G represents the brake actuating cable attached to the operator's brake lever 7 in the fuselage 8. The numeral 9 denotes a pivotally mounted tail skid which is connected by cable 10 with the pedal 7 and a spring 11 normally holds the tail skid 9 in the position shown in Figure 1.

When the brake is fully applied the brake arm F will be pulled up by the brake cable G into the position indicated in Figure 5. If the braking effect is too great, the brake housing will be rotated by the wheel and will carry the brake arm F to a non-braking position. This rotation permits the brake to be released to cause resistance from the pulleys H to the brake arm pivot bearing becomes less and allows the brake arm to take a position that will not depress the brake band so tightly against the drum.

The offset axle D causes the aeroplane to be raised vertically when the housing E rotates. This raising resists the turning of the housing and also tends to turn the housing back to its normal position with the brake arm in a braking position.

A balance is thus obtained between the turning effect of the brake housing tending to release the brake and the aeroplane's weight tending to apply the brake. The amount of offset in the axle depends upon the weight of the aeroplane. With the proper offset maximum braking effect could be obtained without danger of nosing the aeroplane over.

When the tail skid is on the ground the shock cord or spring 11 is stretched allowing the cable 10 to become loose and allow the brake pedal to be depressed by the brakes. If the aeroplane starts to nose over the tail skid raises off the ground tightening the cable 10 thus pulling the brake pedal back and releasing the brake.

It is thought that the construction, operation, utility and advantages of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In an aeroplane, a landing gear, a braking mechanism associated with the landing gear, means for operating the braking mechanism, means operated from the braking mechanism for releasing the braking means should there be a tendency of the aeroplane to nose, a tail skid pivotally mounted, and means operatively connecting the tail skid with the brake operating means to release said breaking means when the tail skid is out of ground engaging contact and to apply the braking mechanism when in ground engaging contact.

2. A safety mechanism for aeroplanes comprising in combination, an aeroplane body and a landing gear comprising supporting struts depending from the body and terminating in a bearing, a crank axle having one offset end journaled in said bearing, a landing wheel freely revoluble upon the other offset end of the axle, brake means including a brake housing fixed to the said offset end of the axle, a brake drum fixed to the said wheel and engaging in said housing, a brake band within the housing and encircling the said drum, an operating rod pivotally mounted on said housing and operatively connected with said band for expanding and contracting the same, guide means mounted on the said supporting struts adjacent the periphery of the said housing, a pivoted brake operating pedal in the said aeroplane body, and an operating cable connecting the said pedal and the said operating rod and passing through said guide means, said guide means being offset relative to the said pedal and operating rod to dispose the cables in an angular path therebetween.

In testimony whereof I affix my signature.

WAYNE BUERER.